US012353249B2

(12) United States Patent
Pailla et al.

(10) Patent No.: US 12,353,249 B2
(45) Date of Patent: Jul. 8, 2025

(54) ROLLABLE SCREEN DEVICE VOICE CALL MANAGEMENT

(71) Applicant: Motorola Mobility LLC, Chicago, IL (US)

(72) Inventors: Panduranga Reddy Pailla, Bangalore (IN); Amit Kumar Agrawal, Bangalore (IN); Vijayprakash Bheemsainrao Idlur, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 366 days.

(21) Appl. No.: 18/182,473

(22) Filed: Mar. 13, 2023

(65) Prior Publication Data

US 2024/0310878 A1    Sep. 19, 2024

(51) Int. Cl.
*G06F 1/16* (2006.01)
*G06V 40/16* (2022.01)
*H04M 1/02* (2006.01)

(52) U.S. Cl.
CPC .......... *G06F 1/1652* (2013.01); *G06F 1/1624* (2013.01); *G06V 40/172* (2022.01); *H04M 1/0235* (2013.01); *H04M 1/0268* (2013.01)

(58) Field of Classification Search
CPC ...... G06F 1/1652; G06F 1/1624; G06F 3/011; G06F 3/012; H04M 1/0268; H04M 1/0235–0239; G06V 40/16–173
See application file for complete search history.

(56) References Cited

U.S. PATENT DOCUMENTS

| | | | |
|---|---|---|---|
| 8,275,420 B2 * | 9/2012 | Lim | G06F 1/1652 455/566 |
| 10,778,821 B1 | 9/2020 | Yang et al. | |
| 11,003,207 B2 * | 5/2021 | Kim | G06F 1/3278 |
| 11,079,803 B2 * | 8/2021 | Ha | H01Q 1/44 |
| 11,284,003 B2 * | 3/2022 | Park | G06F 1/1637 |
| 11,302,113 B1 * | 4/2022 | Luiz Leal Chagas do Nascimento | G06V 40/1365 |
| 11,385,684 B2 * | 7/2022 | Kwon | G09G 3/035 |
| 11,720,141 B2 * | 8/2023 | Kim | H04N 23/54 345/173 |

(Continued)

OTHER PUBLICATIONS

U.S. Appl. No. 18/185,945, "Notice of Allowance", U.S. Appl. No. 18/185,945, Feb. 5, 2024, 9 pages.

(Continued)

*Primary Examiner* — Patrick F Marinelli
(74) *Attorney, Agent, or Firm* — FIG. 1 Patents

(57) ABSTRACT

In aspects of rollable screen device voice call management, a mobile device includes a rollable display screen configurable in one of multiple display states corresponding to respective device form factors, such as a compact form factor, an expanded form factor, and a partial form factor. A slidable display mount is operable to extend or retract the rollable display screen into one of the multiple display states corresponding to a device form factor. The mobile device includes an earpiece that emanates audio during a voice call, and the earpiece is integrated with the rollable display screen and/or the slidable display mount. The mobile device implements a configuration manager that initiates the slidable display mount for configuration of the rollable display screen to movably position the earpiece during the voice call, such as relative to a mouthpiece of the mobile device.

20 Claims, 11 Drawing Sheets

(56) References Cited

U.S. PATENT DOCUMENTS

| | | | |
|---|---|---|---|
| 11,966,260 B1* | 4/2024 | Pailla | G06F 1/1652 |
| 12,081,691 B2* | 9/2024 | Kim | H04M 1/724631 |
| 12,174,672 B2* | 12/2024 | Agrawal | G06F 1/1652 |
| 12,192,399 B2* | 1/2025 | Kim | H04M 1/0237 |
| 12,260,021 B1* | 3/2025 | Merrell | H04M 1/0268 |
| 12,287,676 B2* | 4/2025 | Merrell | G06F 3/016 |
| 12,293,000 B2* | 5/2025 | Gustof | G06F 21/6254 |
| 2010/0015992 A1* | 1/2010 | Wakefield | H04M 1/72484 455/556.1 |
| 2010/0167791 A1* | 7/2010 | Lim | G06F 1/1624 455/566 |
| 2014/0378191 A1* | 12/2014 | Hosoi | H04M 1/6066 455/574 |
| 2017/0003756 A1 | 1/2017 | Gao et al. | |
| 2018/0164852 A1 | 6/2018 | Lim et al. | |
| 2019/0121396 A1* | 4/2019 | Ha | H01Q 1/44 |
| 2021/0263552 A1* | 8/2021 | Kim | G06F 1/3218 |
| 2022/0329687 A1* | 10/2022 | Kim | H04M 1/0268 |
| 2022/0385750 A1* | 12/2022 | Kim | H04M 1/0235 |
| 2023/0214174 A1* | 7/2023 | Kim | G06F 1/1652 715/727 |
| 2024/0098173 A1* | 3/2024 | Wu | H04M 1/72409 |
| 2024/0231557 A1* | 7/2024 | Kim | G06F 3/04886 |
| 2024/0302883 A1* | 9/2024 | Prabhu | G06F 1/1677 |
| 2024/0310878 A1* | 9/2024 | Pailla | G06F 1/1652 |
| 2024/0314231 A1* | 9/2024 | Zhu | H04M 1/0208 |
| 2024/0345630 A1* | 10/2024 | Agrawal | G06F 1/1624 |
| 2025/0103100 A1* | 3/2025 | Merrell | G06F 1/1652 |
| 2025/0103137 A1* | 3/2025 | Merrell | H04M 1/0268 |

OTHER PUBLICATIONS

Pailla, Panduranga Reddy, et al., "US Application as Filed", U.S. Appl. No. 18/185,945, filed Mar. 17, 2023, 44 pages.

U.S. Appl. No. 18/185,945 , "Non-Final Office Action", U.S. Appl. No. 18/185,945, filed Oct. 13, 2023, 10 pages.

\* cited by examiner

ROLLABLE SCREEN DEVICE VOICE CALL MANAGEMENT

BACKGROUND

Devices such as smart devices, mobile devices (e.g., cellular phones, tablet devices, smartphones), consumer electronics, and the like can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have some expandability for larger display viewing, such as with the foldable and slidable devices. However, as device form factors become smaller, such as for compact mobile phones that are convenient to carry, the device components utilized for a voice call, such as the mouthpiece and earpiece speaker, may not be positioned for use during a voice call on a mobile device.

BRIEF DESCRIPTION OF THE DRAWINGS

Implementations of the techniques for rollable screen device voice call management are described with reference to the following Figures. The same numbers may be used throughout to reference like features and components shown in the Figures.

DETAILED DESCRIPTION

Figure 1:
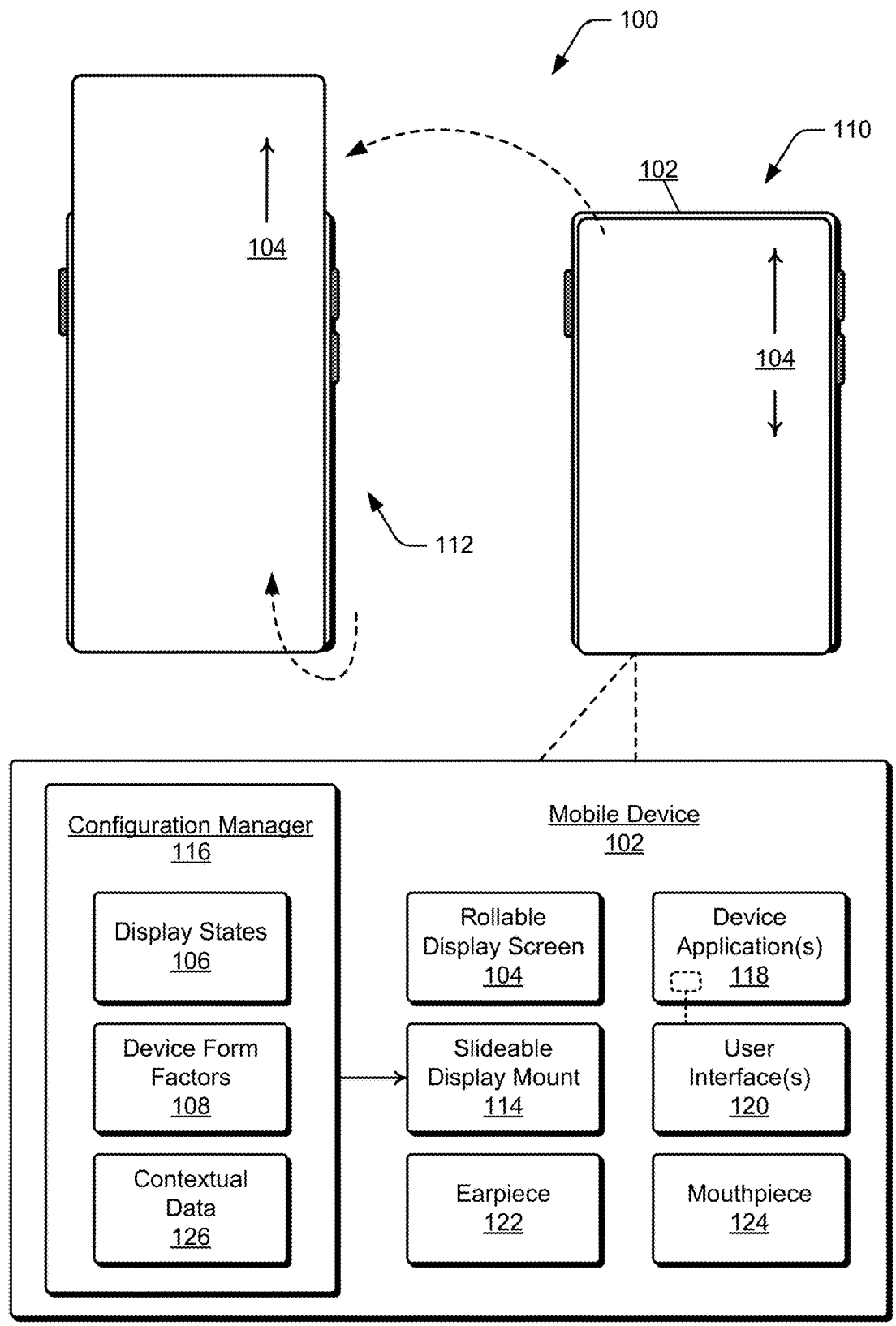
FIG. 1 illustrates an example system for rollable screen device voice call management in accordance with one or more implementations as described herein.

Implementations of techniques for rollable screen device voice call management are implemented as described herein, and the techniques apply to any device that is configurable in various form factors, such as any type of extendable device which can change form factors automatically. A rollable screen device, such as a mobile device (e.g., any type of mobile phone, wireless device, and/or electronic device) can include a rollable display screen that can be configured in any one of various display states, which correspond to respective mobile device form factors. For example, device form factors can include a compact form factor, an expanded form factor, a partial form factor (also referred to as a "peek" form factor), as well as other device form factors. The rollable display screen may be positioned in any incremental display state corresponding to device form factors, such as from the partial form factor to the compact form factor, and between the compact form factor and the expanded form factor. The mobile device includes a slidable display mount that is a powered sliding or translation mechanism operable to transition the rollable display screen between the various display states.

In one or more implementations, the rollable display screen may be extended or retracted automatically, such as based on receiving a voice call on a mobile device, or a voice call being initiated on the mobile device. In aspects of the described techniques for rollable screen device voice call management, a mobile device has an earpiece that emanates sound or audio during a voice call conducted on the device. In one or more implementations, the earpiece can be integrated with the rollable display screen and/or with the slidable display mount of the mobile device. Accordingly, the earpiece can be dynamically positioned during a voice call, such as based on a vertical face size of a user of the mobile device, as well as positioned relative to a fixed or dynamic position of a mouthpiece of the mobile device. The mouthpiece of the mobile device receives the sound or audio (e.g., as spoken by the user of the device) during a voice call conducted on the device. In one or more implementations, the mouthpiece can also be integrated with the rollable display screen and/or with the slidable display mount. Similarly, the mouthpiece can be dynamically positioned during a voice call, such as based on the vertical face size of the user of the device, as well as relative to a fixed or dynamic position of the earpiece.

In aspects of rollable screen device voice call management, a mobile device implements a configuration manager as any type of control unit that manages a configuration of the rollable display screen, to movably position at least one of the earpiece or the mouthpiece during a voice call conducted on the mobile device. Further, in configuring the rollable display screen, the configuration manager not only optimizes a length to which the rollable display screen is extended, but also optimizes a position of the earpiece and/or the mouthpiece, to best fit an estimation of a vertical face size of a user of the mobile device during the voice call.

A mobile device can include any number of various device sensors, such as a front-facing camera, environment sensors (e.g., for motion, sound, lighting, etc.), and proximity sensors. In one or more implementations, the configuration manager interfaces with the device sensors (e.g., utilizes the front-facing camera) to detect facial features of a user of the mobile device, and in conjunction with camera-based facial recognition, the configuration manager can estimate a vertical face size of the user of the device from the detected facial features. In implementations, the configuration manager can alternatively estimate a vertical face size of a user of the mobile device based on contextual data corresponding to the user. The contextual data can indicate an age or a gender of the user of the device, and the configuration manager can subsequently estimate the vertical face size of the user based on a predefined face size corresponding to the age of the user, or another predefined face size corresponding to the gender of the user. In other implementations, the configuration manager can determine or detect a proximity of the earpiece to a user of the mobile device based on one or more proximity sensors, and the configuration manager initiates to movably position the earpiece and/or the mouthpiece based on the proximity of the earpiece to the user and/or based on the vertical face size of the user.

While features and concepts of the described techniques for rollable screen device voice call management can be implemented in any number of different devices, systems, environments, and/or configurations, implementations of the techniques for rollable screen device voice call management are described in the context of the following example devices, systems, and methods.

FIG. 1 illustrates an example system 100 for rollable screen device voice call management, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 11. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various display states 106 corresponding to respective mobile device form factors 108. For example, the device form factors 108 can include a compact form factor, an expanded form factor, a partial form factor (also referred to as a "peek" form factor), as well as other device form factors. The rollable display screen 104 may be positioned in any incremental display state 106 corresponding to device form factors between the compact form factor and the expanded form factor. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around the device housing.

The mobile device 102 includes a slidable display mount 114 that is a powered sliding or translation mechanism (e.g., an actuator, motor, gear assembly, drive screws, etc.) operable to transition the rollable display screen 104 around the surfaces of the device housing, such as between the extended display state where the rollable display screen 104 extends distally from the device housing, and the retracted display state where the rollable display screen 104 corresponds to the compact form factor of the device with the flexible display wrapping around the surfaces of the device housing. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device to implement different aspects of rollable screen device voice call management, as described herein. In this example system 100, the mobile device 102 includes a configuration manager 116 that represents functionality (e.g., logic, software, and/or hardware) enabling the automatic function control of the slidable display mount 114 for translating and positioning the rollable display screen 104. The configuration manager 116 can be implemented as computer instructions stored on computer-readable storage media (e.g., memory of the device), or in any other suitable memory device or electronic data storage, and can be executed by a processor system of the device. Alternatively or in addition, the configuration manager 116 can be implemented at least partially in firmware and/or at least partially in computer hardware. For example, at least part of the configuration manager 116 may be executable by a computer processor, and/or at least part of the configuration manager may be implemented in logic circuitry. In one or more implementations, the configuration manager 116 may include independent processing, memory, and/or logic components functioning as a computing and/or electronic device integrated with the mobile device 102.

The mobile device 102 can include and implement various device applications 118, such as any type of messaging application, email application, video communication application, cellular communication application, music application, gaming application, media application, social platform applications, and/or any other of the many possible types of device applications. Many of the device applications 118 have an associated application user interface 120 that is generated and displayed for user interaction and viewing, such as on the rollable display screen 104 of the mobile device 102. Generally, an application user interface, or any other type of video, image, graphic, and the like is digital image content that is displayable on the rollable display screen 104 of the mobile device. In this example system 100, the configuration manager 116 can be implemented as a software application or module, such as executable software instructions that are executable with a processor system of the mobile device 102 to implement the techniques and features described herein. As a device application, the configuration manager 116 may have an associated application user interface 120 that is generated and displayable for user interaction and viewing, such as on the rollable display screen 104 of the mobile device. In aspects of the described techniques, the configuration manager 116 may utilize a facial recognition system (e.g., as an example of a device application).

The rollable display screen 104 can be utilized to display any of various types of content on the mobile device 102. In one or more implementations, the mobile device 102 generates and/or outputs content from a device application 118 and/or operating system of the device, and the content is displayed on the rollable display screen 104. For example, a media application may receive streaming content from a remote server via a communication network for display on the rollable display screen.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In this example system 100, the mobile device 102 also includes an earpiece 122 (also referred herein as a phone earpiece, or phone earpiece speaker) representative of an electronic device (e.g., an electroacoustic transducer such as a speaker) configured to emanate sound or audio during any voice call conducted on the mobile device 102. In one or more implementations, the earpiece 122 can be integrated with the rollable display screen 104 and/or with the slidable display mount 114. Further, while integrated with at least the rollable display screen 104, the earpiece 122 can be dynamically positioned during a voice call based at least in part on a vertical face size of a user of the mobile device 102, as well as positioned relative to a fixed or dynamic position of a mouthpiece 124 of the mobile device.

The mouthpiece 124 of the mobile device 102 is representative of an electronic device (e.g., an electroacoustic transducer such as a microphone) configured to receive sound or audio during any voice call conducted on the mobile device 102. In one or more implementations, the mouthpiece 124 can also be integrated with the rollable display screen 104 and/or the slidable display mount 114. Further, while integrated with at least the rollable display screen 104, the mouthpiece 124 can be dynamically positioned during a voice call based at least in part on a vertical face size of a user of the mobile device 102, as well as relative to a fixed or dynamic position of the earpiece 122.

In one or more implementations, the mobile device 102 may also be configured in other device form factors 108, such as a partial form factor, which is further shown and described with reference to FIG. 2. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, device sensors such as a front-facing camera, environment sensors (e.g., for motion, sound, lighting, etc.), a proximity sensor, and/or a phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104, which corresponds to the partial form factor of the mobile device 102.

In one or more implementations, the configuration manager 116 can interface with a front-facing camera to detect facial features of a user of the mobile device 102, and in conjunction with camera-based facial recognition, the configuration manager 116 can estimate a vertical face size of the user of the mobile device 102 from the detected facial features. In implementations, the configuration manager 116 can alternatively estimate a vertical face size of a user of the mobile device 102 based at least in part on contextual data 126 corresponding to the user. The contextual data 126 can indicate an age or a gender of the user of the mobile device 102. The configuration manager 116 can subsequently estimate the vertical face size of the user based on a predefined face size corresponding to the age of the user, or another predefined face size corresponding to the gender of the user.

In implementations, the configuration manager 116 can initiate to configure the mobile device 102 in the partial form factor corresponding to the sensor display state of the rollable display screen 104 when an incoming voice call will require user access to the phone earpiece 122, or when the front-facing camera is needed for image capture. Although generally described throughout this disclosure as the configuration manager 116 initiating and/or automatically controlling the configuration and/or reconfiguration of the mobile device form factors 108, a user of the device may initiate to configure the device in any form factor and/or display state of the rollable display screen, and override configuration settings of the configuration manager.

In one or more implementations, a portion of the rollable display screen 104 rotates around the housing of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the rear-facing portion of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

In aspects of the techniques described herein for rollable screen device voice call management, the configuration manager 116 of the mobile device 102 manages a configuration of the rollable display screen 104, to movably position the earpiece 122 and/or the mouthpiece 124 during a voice call conducted on the mobile device 102. The earpiece 122 and/or the mouthpiece 124 can be integrated with the rollable display screen 104 and/or with the slidable display mount 114. Further, in configuring the rollable display screen 104, the configuration manager 116 not only optimizes a length to which the rollable display screen 104 is extended, but also optimizes a position of the earpiece 122 and/or the mouthpiece 124, to best fit an estimation of a vertical face size of a user of the mobile device 102 during the voice call.

To estimate the vertical face size of the user of the mobile device 102, the configuration manager 116 can utilize one or more device sensors (e.g., a front-facing camera and/or other sensors) capable of detecting facial features of the user. Thereafter, artificial intelligence (e.g., camera-based facial recognition) can be applied to the detected facial features to estimate the vertical face size of the user. The configuration manager 116 alternatively estimates the vertical face size of the user of the mobile device 102 using the contextual data 126 corresponding to the user. The contextual data 126 can indicate an age or a gender of the user, and the contextual data can include an indication of a predefined face size that corresponds to the age of the user, and/or another predefined face size that corresponds to the gender of the user. The configuration manager 116 can then estimate the vertical face size of the user of the mobile device 102 based on the predefined face size(s) corresponding to the age and/or the gender of the user. In other implementations, the configuration manager 116 can determine or detect a proximity of the earpiece 122 to a user of the mobile device 102 based on one or more proximity sensors, and the configuration manager initiates to movably position the earpiece 122 based on the proximity of the earpiece to the user and/or based on the vertical face size of the user.

Figure 2:
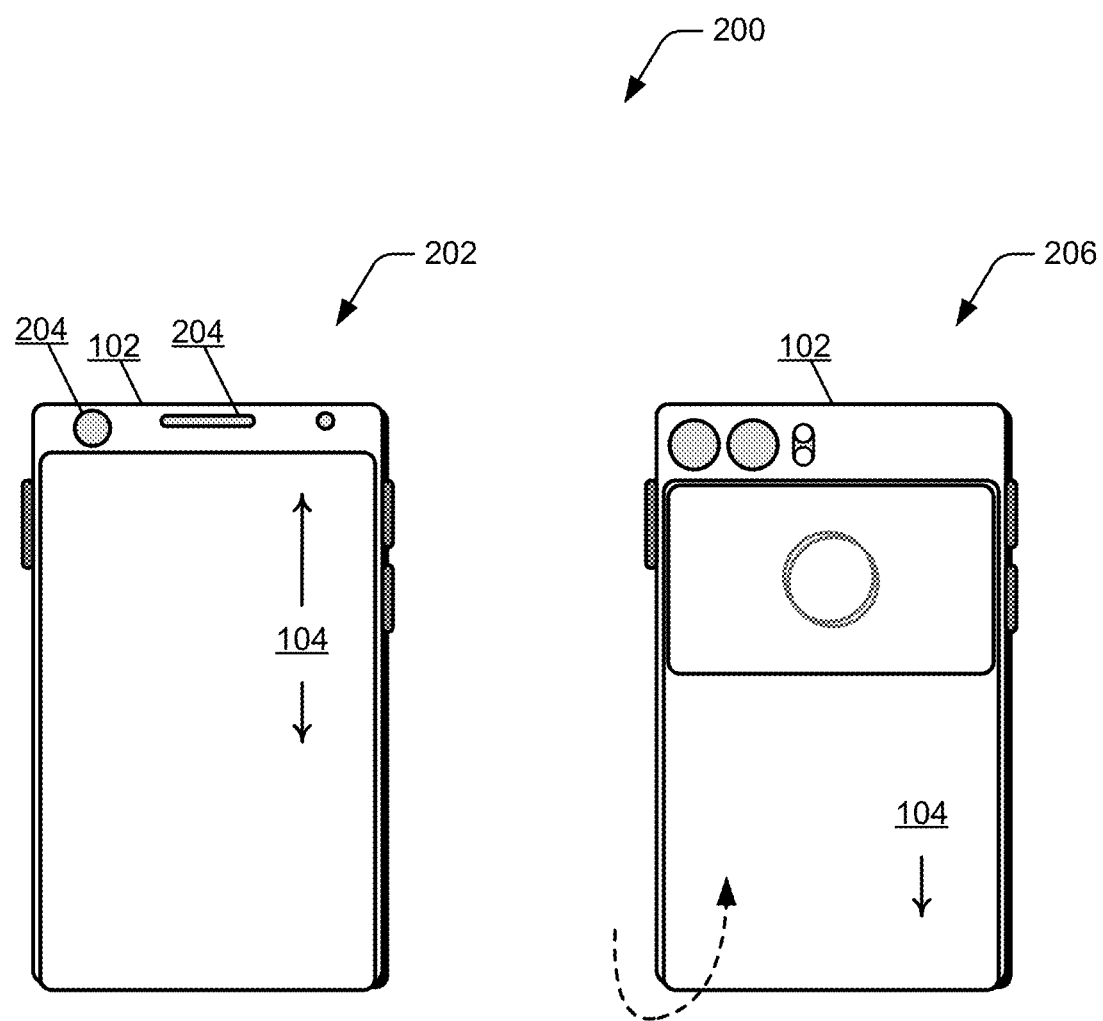
FIG. 2 further illustrates example views of a mobile device, which supports rollable screen device voice call management in accordance with one or more implementations as described herein.

FIG. 2 further illustrates example views 200 of the mobile device in aspects of rollable screen device voice call management, as described herein. In these example views 200, the mobile device 102 is shown in a front view 202 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 204 and/or components that are otherwise hidden behind the rollable display screen 104 in both the compact form factor (retracted display state) and expanded form factor (extended display state). For example, the device sensors 204, such as a front-facing camera, environment sensors (e.g., for motion, sound, lighting, etc.), a proximity sensor, and/or phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104 that corresponds to the partial form factor of the mobile device 102. In these example views 200, the mobile device 102 is also shown in a back view 206 in the partial form factor of the device, with the rollable display screen 104 configured in the sensor display state. The rollable display screen 104 is translated by the slidable display mount 114 around the device housing, and forms the rear-facing portion of the display screen.

Figure 3:
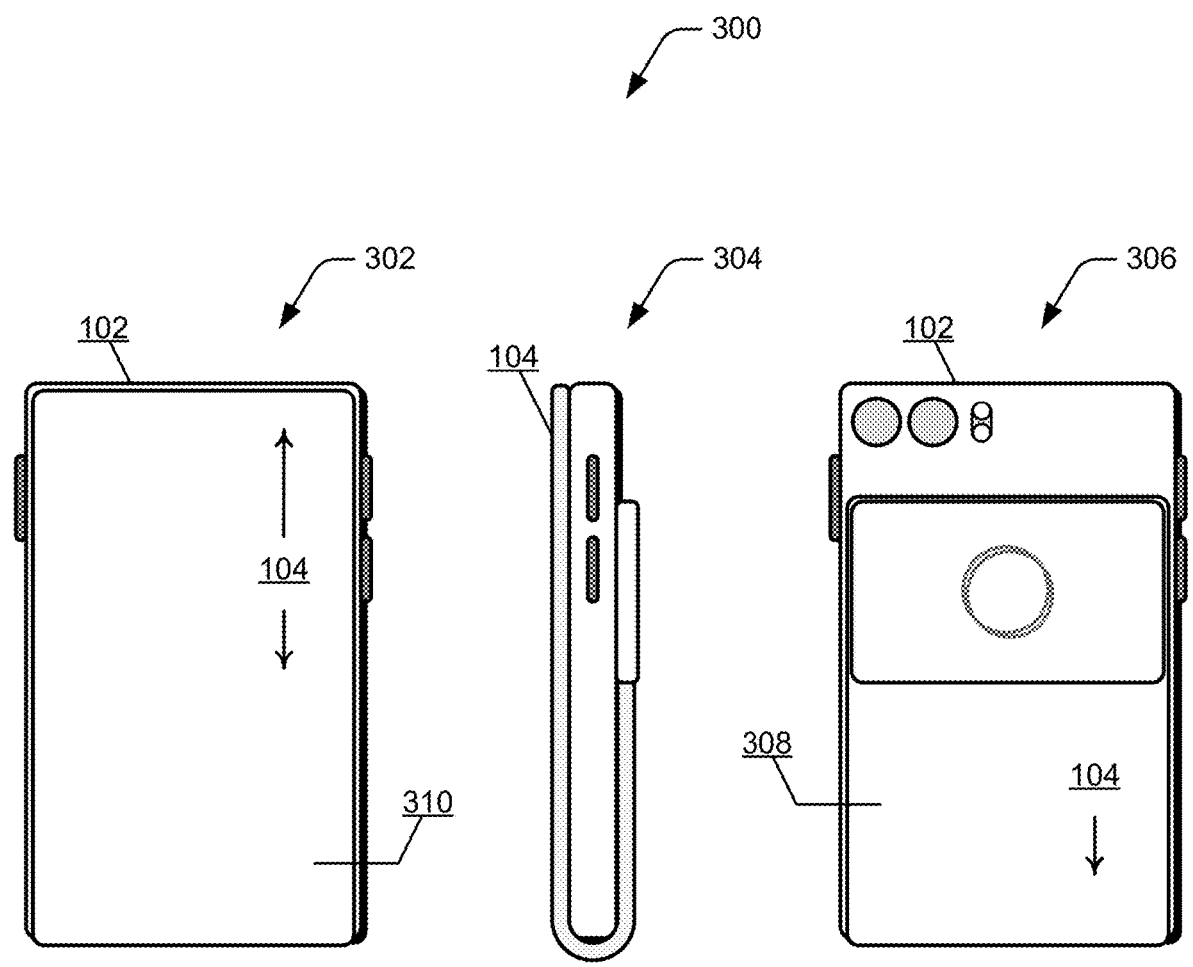
FIG. 3 further illustrates example views of the mobile device, which supports rollable screen device voice call management in accordance with one or more implementations as described herein.

FIG. 3 further illustrates example views 300 of the mobile device in aspects of rollable screen device voice call management, as described herein. In these example views 300, the mobile device 102 is shown in a front view 302, a side view 304, and a back view 306 in the compact form factor, with the rollable display screen 104 configured in the retracted display state. In this configuration, a portion of the rollable display screen 104 rotates around the housing of the mobile device 102, forming a rear-facing portion 308 of the display screen (e.g., relative to the front-facing portion 310 of the display screen). In implementations, both the front-facing portion 310 and the rear-facing portion 308 of the rollable display screen 104 can be used to display content, such as related content or content associated with different applications.

Figure 4:
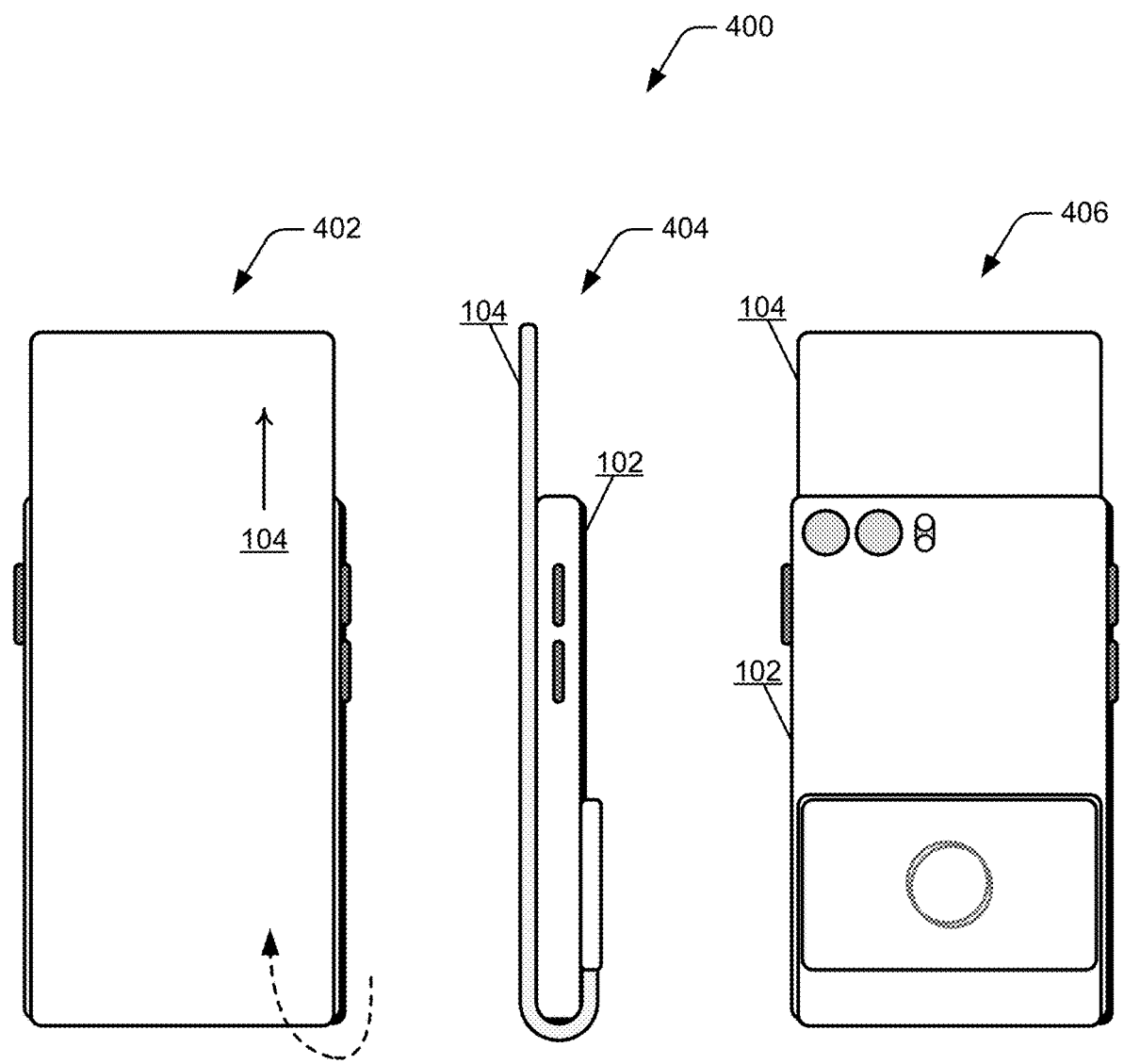
FIG. 4 further illustrates example views of the mobile device, which supports rollable screen device voice call management in accordance with one or more implementations as described herein.

FIG. 4 further illustrates example views 400 of the mobile device in aspects of rollable screen device voice call management, as described herein. In these example views 400, the mobile device 102 is shown in a front view 402, a side view 404, and a back view 406 in the expanded form factor, with the rollable display screen 104 configured in the extended display state. In this configuration, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

As illustrated in the figures, the slidable display mount 114 translates the rollable display screen 104 around the device housing to change the overall length of the flexible display as viewed from the front of the mobile device 102 (e.g., as shown in the front view 402). The slidable display mount 114 also translates the rollable display screen 104 in an opposite direction around the device housing to the retracted display state in the compact form factor of the device, and more of the rollable display screen 104 is viewable as the rear-facing portion of the display. Content, such as any type of graphics and images, can be displayed on any section of the rollable display screen 104, including on the front-facing portion, on the rear-facing portion, and/or on the curved end portion of the display screen.

Figure 5:
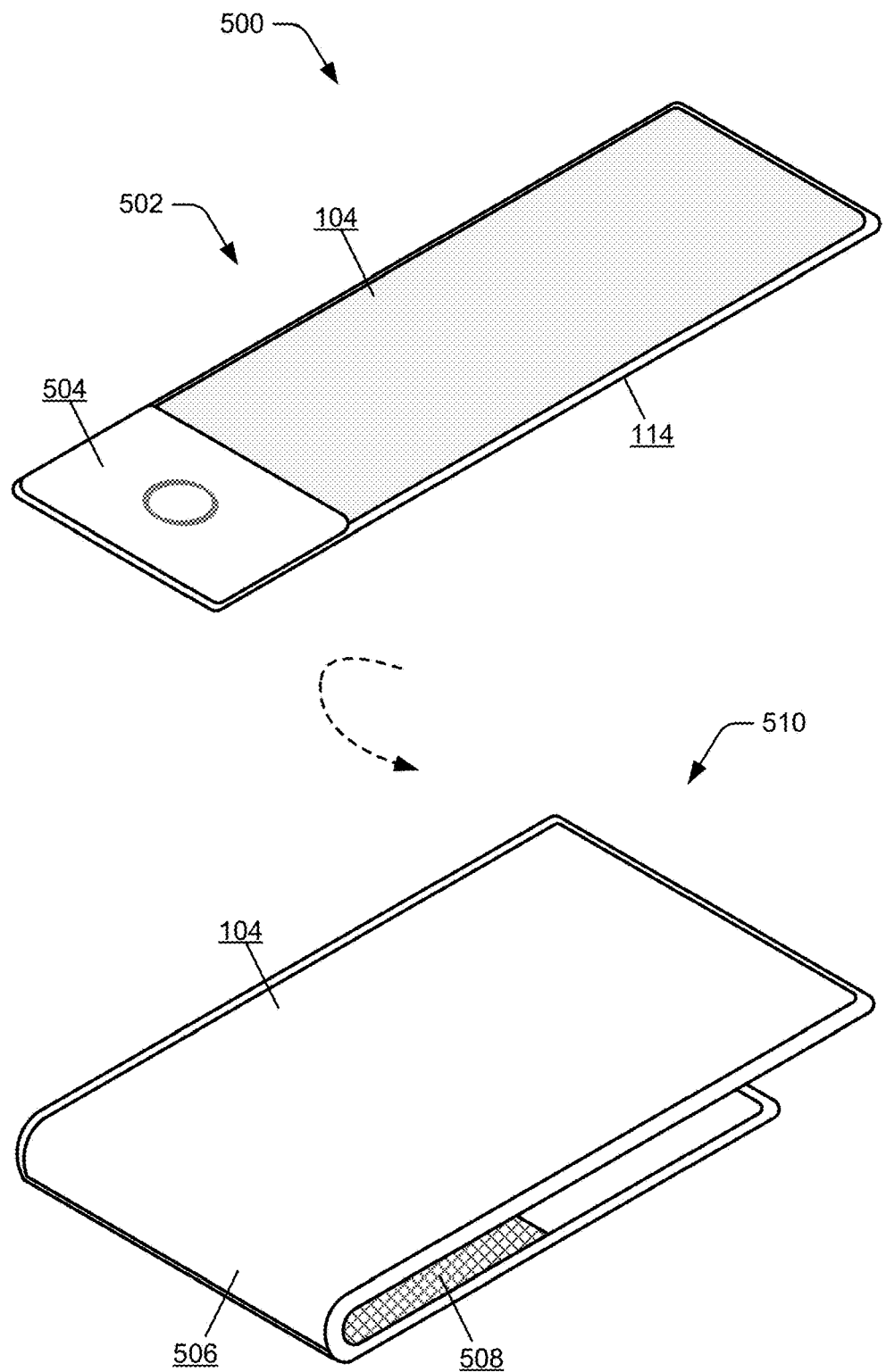
FIG. 5 illustrates example views of a rollable display screen and mounting assembly, which supports rollable screen device voice call management in accordance with one or more implementations as described herein.

FIG. 5 illustrates example views 500 of the rollable display screen and the slidable display mount of the mobile device in aspects of rollable screen device voice call management, as described herein. In these example views 500, the rollable display screen 104 integrated with the slidable display mount 114 is shown configured at 502, along with a backplate 504. A display roller mechanism can be implemented to facilitate the flexible display and mounting assembly (e.g., the rollable display screen 104 and the slidable display mount 114) wrapping around the device housing. The display roller mechanism includes a rotor positioned within the curvilinear section 506 of the flexible display and mounting assembly to facilitate translation of the rollable display screen 104 in the various display states. In one or more implementations, the slidable display mount 114 includes a substrate that includes a flexible portion 508, which allows the flexible display and mounting assembly to wrap and deform around the device housing. As shown at 510, the rollable display screen 104 and the slidable display mount 114 are wrapped around to form the curvilinear section 506 of the flexible display, along with two linear sections of the display as the front-facing portion and the rear-facing portion of the rollable display screen. As shown in the example views 500, a cross section of the rollable display screen 104 and the slidable display mount 114 forms a J-shape or U-shape with the curvilinear section 506 of the display.

Figure 6:
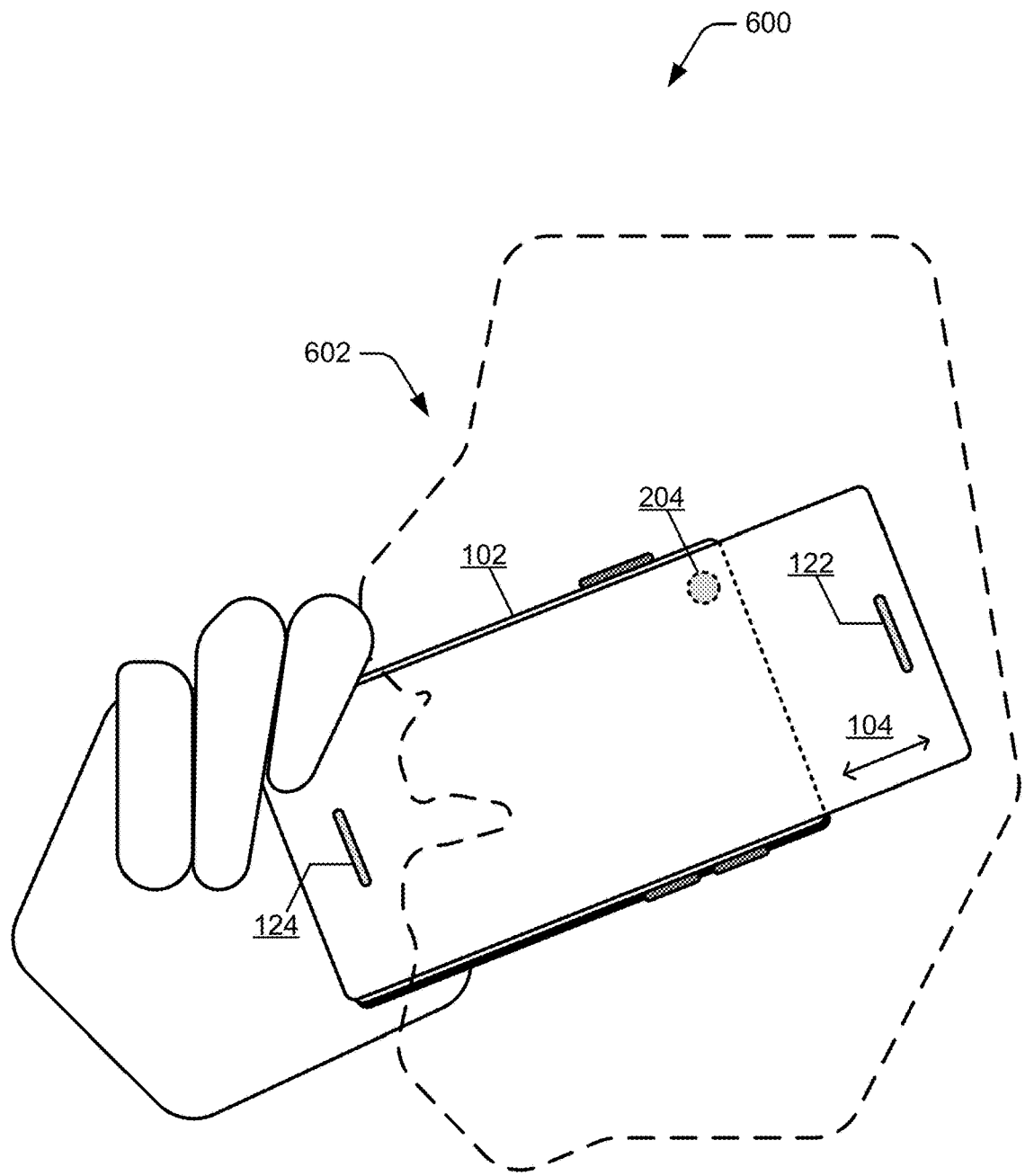
FIG. 6 illustrates an example use scenario, which supports rollable screen device voice call management in accordance with one or more implementations as described herein.

FIG. 6 further illustrates an example use scenario 600 of the mobile device in aspects of rollable screen device voice call management, as described herein. In this example use scenario 600, a user 602 of the mobile device 102 may receive or initiate a voice call. Upon detecting the voice call, the configuration manager 116 can utilize the front-facing camera (e.g., a device sensor 204) to detect facial features of the user and estimate a vertical face size of the user based on the detected facial features. Alternatively, or in addition, the configuration manager 116 can access the contextual data 126 corresponding to the user, and the contextual data indicates an age and/or a gender of the user. The configuration manager 116 can estimate the vertical face size of the user based on a predefined face size corresponding to the age of the user or another predefined face size corresponding to the gender of the user. Hereafter, the configuration manager 116 initiates operation of the slidable display mount 114, thereby extending the rollable display screen 104 up or down from a retracted display state into an extended display state. As a result of extending the rollable display screen 104, the configuration manager 116 movably positions at least one of the earpiece 122 or the mouthpiece 124 based on the estimated vertical face size of the user.

Example methods 700, 800, 900, and 1000 are described with reference to respective FIGS. 7-10 in accordance with one or more implementations for rollable screen device voice call management, as described herein. Generally, any services, components, modules, managers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
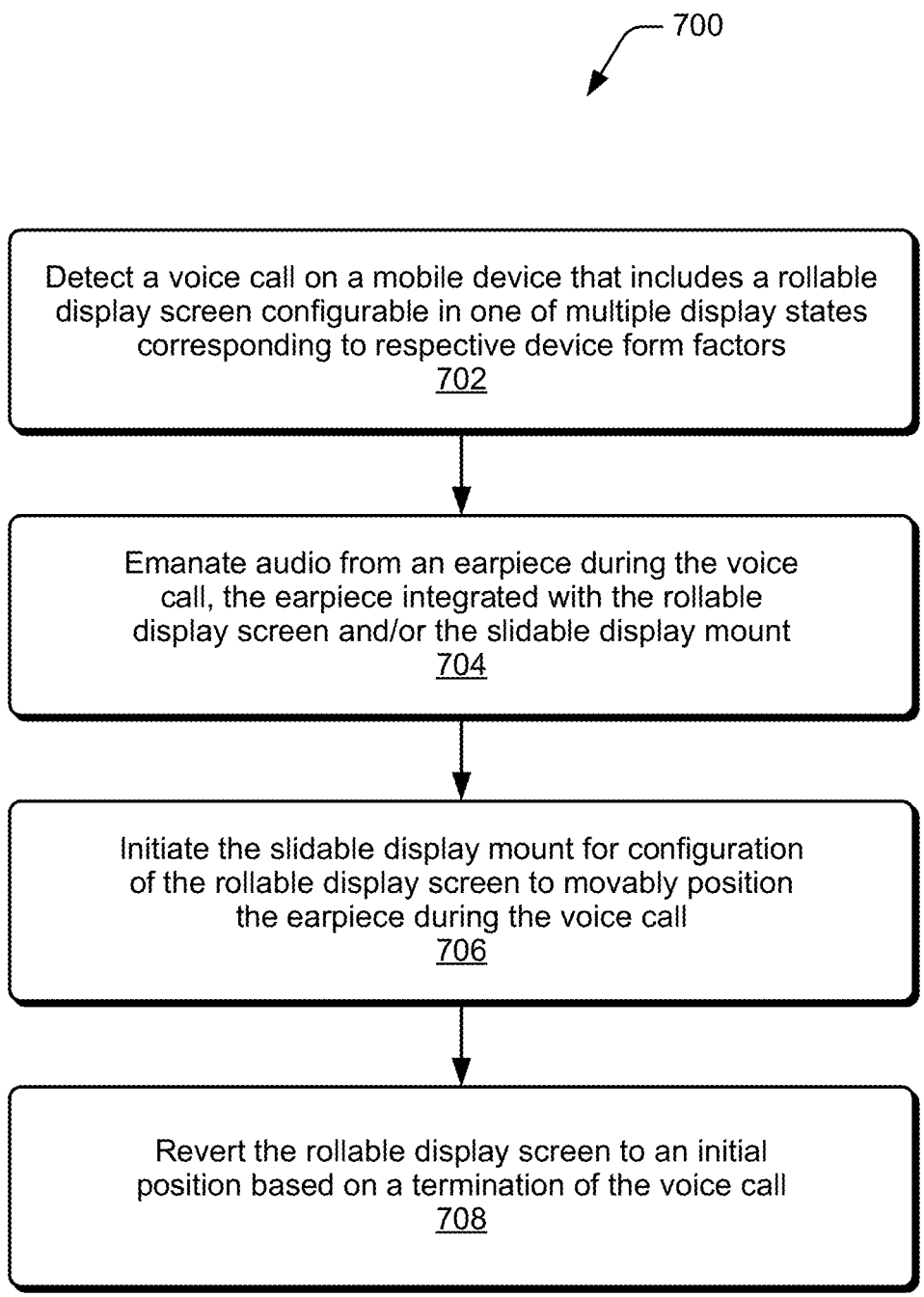
FIGS. 7-10 illustrate example methods for rollable screen device voice call management in accordance with one or more implementations of the techniques described herein.

FIG. 7 illustrates example method(s) 700 for rollable screen device voice call management. The order in which the method is described is not intended to be construed as a limitation, and any number or combination of the described method operations can be performed in any order to perform a method, or an alternate method.

At 702, a voice call is detected on a mobile device that includes a rollable display screen configurable in one of multiple display states corresponding to respective device form factors. For example, the mobile device 102 includes the rollable display screen 104 and the slidable display mount 114 that is operable to extend or retract the rollable display screen, and the configuration manager 116 detects a voice call (i.e., either an incoming or outgoing voice call) on the mobile device. The mobile device 102 includes the rollable display screen 104 configurable in one of the multiple display states 106 corresponding to respective device form factors 108, which include the compact form factor, the expanded form factor, and the partial form factor.

At 704, audio is emanated from an earpiece during the voice call, where the earpiece is integrated with the rollable display screen and/or the slidable display mount. For example, the earpiece 122 emanates the voice call audio during the voice call, and the earpiece is integrated with the rollable display screen 104 and/or the slidable display mount 114.

At 706, the slidable display mount is initiated for configuration of the rollable display screen to movably position the earpiece during the voice call. For example, the configuration manager 116 initiates to operate the slidable display mount 114 for configuration of the rollable display screen 104, thereby extending or retracting the rollable display screen 104 to movably position the earpiece 122 during the voice call.

At 708, the rollable display screen is reverted to an initial position based on a termination of the voice call. For example, the configuration manager 116 initiates to operate the slidable display mount 114 and revert the rollable display screen 104 to its initial position before the voice call based on the termination of the voice call.

Figure 8:
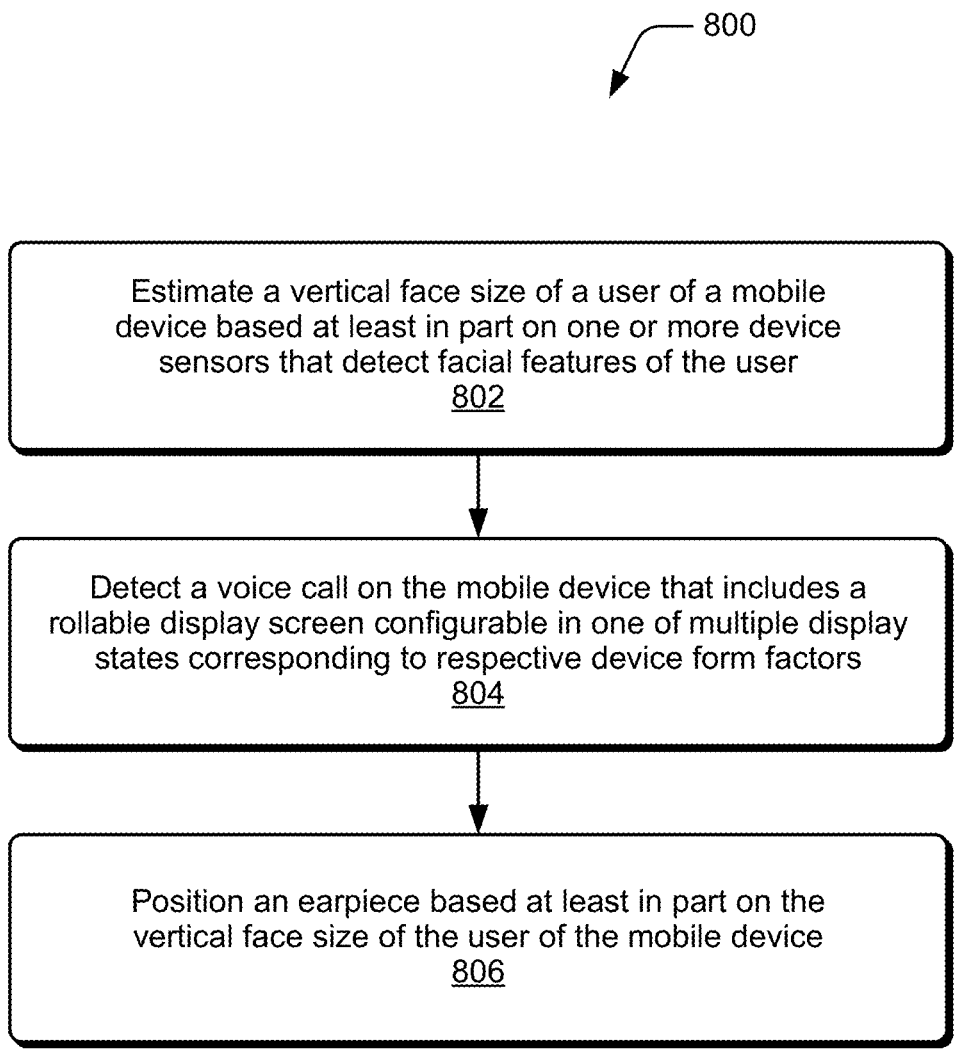

FIG. 8 illustrates example method(s) 800 for rollable screen device voice call management. The order in which the method is described is not intended to be construed as a limitation, and any number or combination of the described method operations can be performed in any order to perform a method, or an alternate method.

At 802, a vertical face size of a user of a mobile device is estimated based at least in part on one or more device sensors that detect facial features of the user. For example, the configuration manager 116 estimates the vertical face size of a user of the mobile device 102 based on device sensors that detect the facial features of the user. In implementations, the device sensors include a camera imager and the configuration manager 116 utilizes a facial recognition system to estimate the vertical face size of the user of the mobile device. In one or more implementations, the configuration manager 116 estimates the vertical face size of the user of the mobile device based on the contextual data 126 corresponding to the user. For example, the contextual data 126 indicates an age of the user of the mobile device 102, and the vertical face size is based on a predefined face size corresponding to the age of the user. Alternatively, or in addition, the contextual data 126 indicates a gender of the user of the mobile device, and the vertical face size is based on a predefined face size corresponding to the gender of the user.

At 804, a voice call is detected on the mobile device that includes a rollable display screen configurable in one of multiple display states corresponding to respective device form factors. For example, the mobile device 102 includes the rollable display screen 104 and the slidable display mount 114 that is operable to extend or retract the rollable display screen, and the configuration manager 116 detects a voice call (i.e., either an incoming or outgoing voice call) on the mobile device.

At 806, the earpiece is positioned based at least in part on the vertical face size of the user of the mobile device. For example, the earpiece 122 of the mobile device 102 emanates the voice call audio during the voice call, and the earpiece is integrated with the rollable display screen 104 and/or the slidable display mount 114. The configuration manager 116 initiates to operate the slidable display mount 114 and position the earpiece 122 by extending the rollable display screen 104 to a corresponding expanded form factor of the mobile device, where the rollable display screen extends either up or down from a retracted display state into an extended display state.

Figure 9:
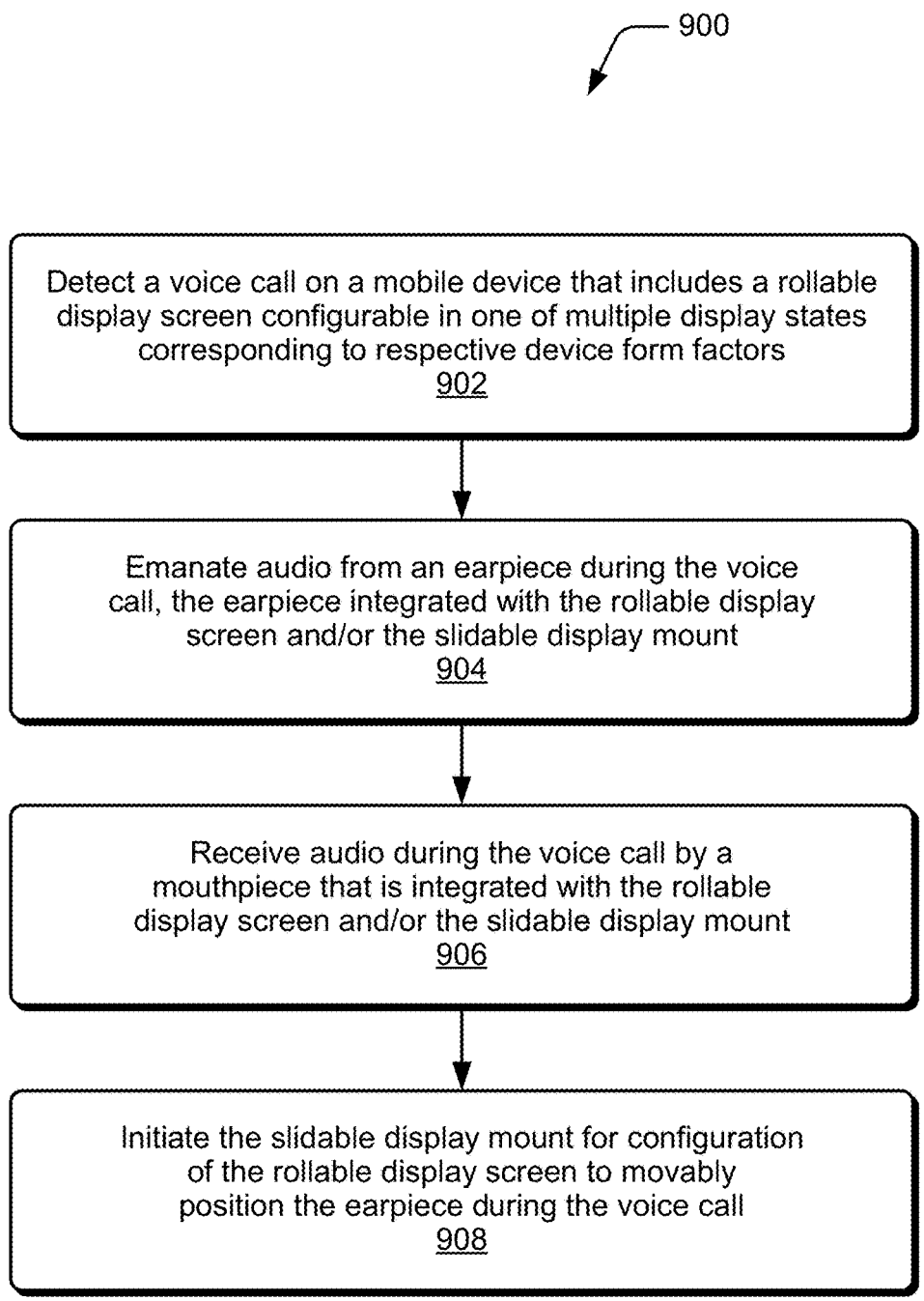

FIG. 9 illustrates example method(s) 900 for rollable screen device voice call management. The order in which the method is described is not intended to be construed as a limitation, and any number or combination of the described method operations can be performed in any order to perform a method, or an alternate method.

At 902, a voice call is detected on a mobile device that includes a rollable display screen configurable in one of multiple display states corresponding to respective device form factors. For example, the mobile device 102 includes the rollable display screen 104 and the slidable display mount 114 that is operable to extend or retract the rollable display screen, and the configuration manager 116 detects a voice call (i.e., either an incoming or outgoing voice call) on the mobile device.

At 904, audio is emanated from an earpiece during the voice call, where the earpiece is integrated with the rollable display screen and/or with the slidable display mount. For example, the earpiece 122 emanates the voice call audio during the voice call, and the earpiece is integrated with the rollable display screen 104 and/or with the slidable display mount 114.

At 906, audio is received during the voice call by a mouthpiece that is integrated with the rollable display screen and/or with the slidable display mount. For example, the mouthpiece 124 of the mobile device receives the voice call audio (e.g., as spoken by the user of the device) during the voice call, and the mouthpiece 124 can be integrated with the rollable display screen 104 and/or with the slidable display mount 114.

At 908, the slidable display mount is initiated for configuration of the rollable display screen to movably position the earpiece during the voice call. For example, the configuration manager 116 initiates to operate the slidable display mount 114 for configuration of the rollable display screen 104 to movably position the earpiece 122 during the voice call. In implementations, the mouthpiece 124 of the mobile device 102 may be configured in a fixed position on the device, in which case the configuration manager 116 initiates to movably position the earpiece 122 relative to the fixed position of the mouthpiece. Alternatively, in other implementations, the mouthpiece 124 of the mobile device 102 may also be moved and positioned during a voice call, in which case the configuration manager 116 initiates to movably position the earpiece 122 and the mouthpiece 124 relative to each other during the voice call.

Figure 10:
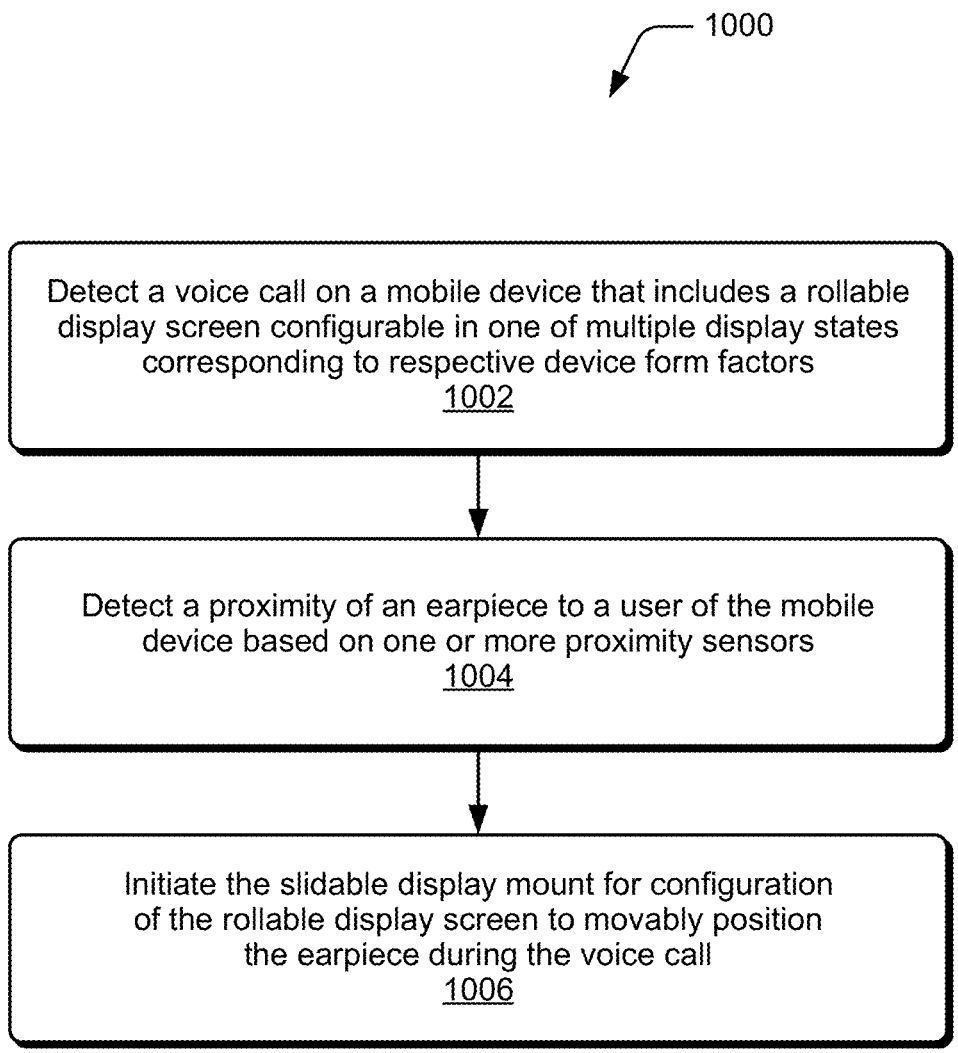

FIG. 10 illustrates example method(s) 1000 for rollable screen device voice call management. The order in which the method is described is not intended to be construed as a limitation, and any number or combination of the described method operations can be performed in any order to perform a method, or an alternate method.

At 1002, a voice call is detected on a mobile device that includes a rollable display screen configurable in one of multiple display states corresponding to respective device form factors. For example, the mobile device 102 includes the rollable display screen 104 and the slidable display mount 114 that is operable to extend or retract the rollable display screen, and the configuration manager 116 detects a voice call (i.e., either an incoming or outgoing voice call) on the mobile device.

At 1004, a proximity of an earpiece to a user of the mobile device is detected based on one or more proximity sensors. For example, the earpiece 122 of the mobile device 102 emanates the voice call audio during the voice call, and the earpiece is integrated with the rollable display screen 104 and/or the slidable display mount 114. The configuration manager 116 can determine or detect the proximity of the earpiece 122 to a user of the mobile device 102 based on one or more proximity sensors of the device.

At 1006, the slidable display mount is initiated for configuration of the rollable display screen to movably position the earpiece during the voice call. For example, the configuration manager 116 initiates to operate the slidable display mount 114 for configuration of the rollable display screen 104 to movably position the earpiece 122 during the voice call based on the proximity of the earpiece to the user. In implementations, the rollable display screen 104 extends either up or down from a retracted display state into an extended display state.

Figure 11:
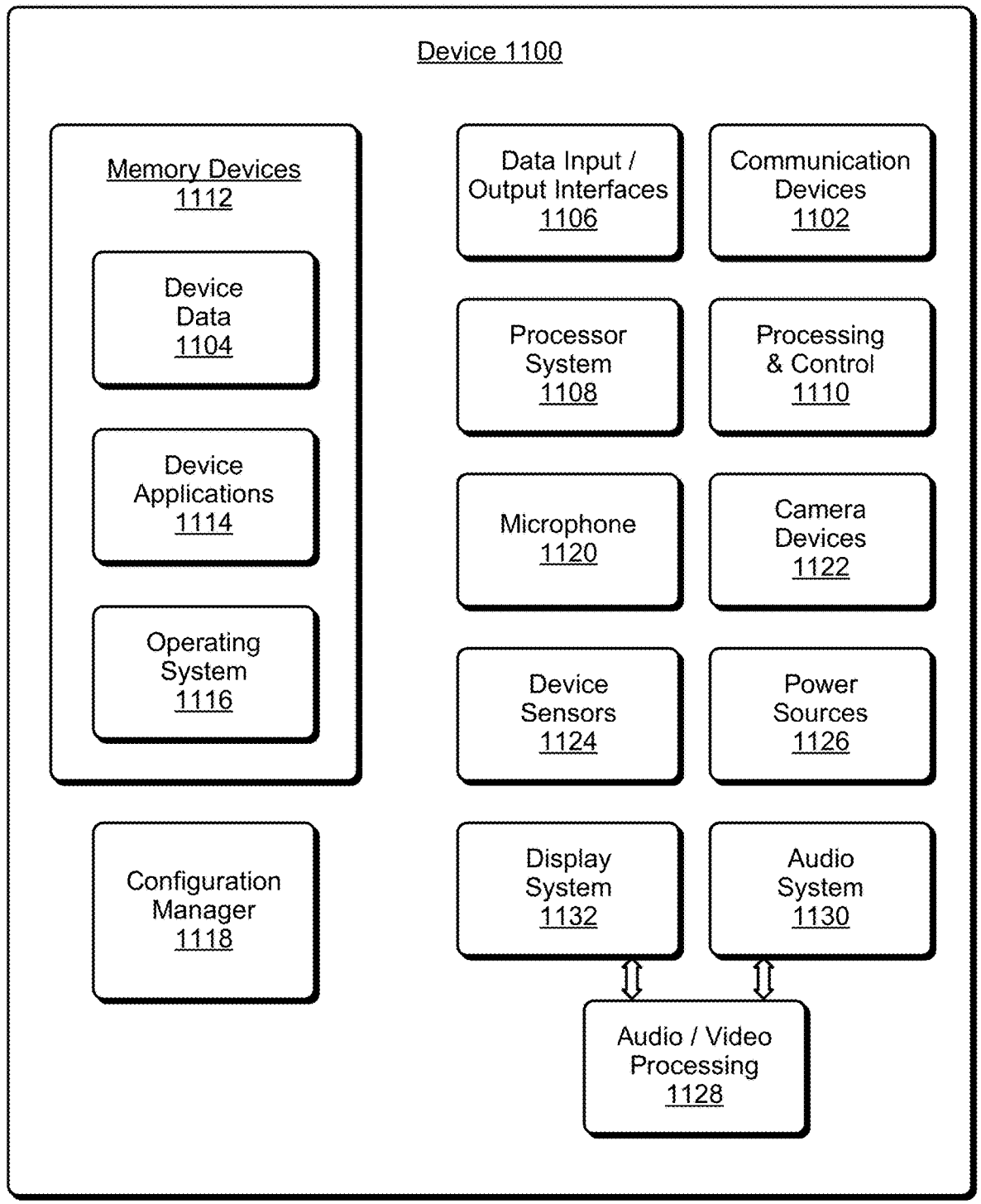
FIG. 11 illustrates various components of an example device that can be used to implement the techniques for rollable screen device voice call management as described herein.

FIG. 11 illustrates various components of an example device 1100, which can implement aspects of the techniques and features for rollable screen device voice call management, as described herein. The example device 1100 can be implemented as any of the devices described with reference to the previous FIGS. 1-10, such as any type of a wireless device, mobile device, mobile phone, flip phone, client device, companion device, paired device, display device, tablet, computing, communication, entertainment, gaming, media playback, and/or any other type of computing and/or electronic device. For example, the mobile device 102 described with reference to FIGS. 1-10 may be implemented as the example device 1100.

The example device 1100 can include various, different communication devices 1102 that enable wired and/or wireless communication of device data 1104 with other devices. The device data 1104 can include any of the various devices data and content that is generated, processed, determined, received, stored, and/or communicated from one computing device to another. Generally, the device data 1104 can include any form of audio, video, image, graphics, and/or electronic data that is generated by applications executing on a device. The communication devices 1102 can also include transceivers for cellular phone communication and/or for any type of network data communication.

The example device 1100 can also include various, different types of data input/output (I/O) interfaces 1106, such as data network interfaces that provide connection and/or communication links between the devices, data networks, and other devices. The I/O interfaces 1106 can be used to couple the device to any type of components, peripherals, and/or accessory devices, such as a computer input device that may be integrated with the example device 1100. The I/O interfaces 1106 may also include data input ports via which any type of data, information, media content, communications, messages, and/or inputs can be received, such as user inputs to the device, as well as any type of audio, video, image, graphics, and/or electronic data received from any content and/or data source.

The example device 1100 includes a processor system 1108 of one or more processors (e.g., any of microprocessors, controllers, and the like) and/or a processor and memory system implemented as a system-on-chip (SoC) that processes computer-executable instructions. The processor system 1108 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1110. The example device 1100 may also include any type of a system bus or other data and command transfer system that couples the various components within the device. A system bus can include any one or combination of different bus structures and architectures, as well as control and data lines.

The example device 1100 also includes memory and/or memory devices 1112 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1112 include volatile memory and non-volatile memory, fixed and removable media devices, and any suitable memory device or electronic data storage that maintains data for computing device access. The memory devices 1112 can include various implementations of random-access memory (RAM), read-only memory (ROM), flash memory, and other types of storage media in various memory device configurations. The example device 1100 may also include a mass storage media device.

The memory devices 1112 (e.g., as computer-readable storage memory) provide data storage mechanisms, such as to store the device data 1104, other types of information and/or electronic data, and various device applications 1114 (e.g., software applications and/or modules). For example, an operating system 1116 can be maintained as software instructions with a memory device 1112 and executed by the processor system 1108 as a software application. The device applications 1114 may also include a device manager, such as any form of a control application, software application, signal-processing and control module, code that is specific to a particular device, a hardware abstraction layer for a particular device, and so on.

In this example, the device 1100 includes a configuration manager 1118 that implements various aspects of the described features and techniques described herein. The configuration manager 1118 can be implemented with hardware components and/or in software as one of the device applications 1114, such as when the example device 1100 is implemented as the mobile device 102 described with reference to FIGS. 1-10. An example of the configuration manager 1118 is the configuration manager 116 implemented in the mobile device 102, such as a software application and/or as hardware components in the wireless device. In implementations, the configuration manager 1118 may include independent processing, memory, and logic components as a computing and/or electronic device integrated with the example device 1100.

The example device 1100 can also include a microphone 1120 and/or camera devices 1122, as well as device sensors 1124, including proximity sensors and/or motion sensors, such as may be implemented as components of an inertial measurement unit (IMU). The device sensors 1124 can be implemented with various motion sensors, such as a gyroscope, an accelerometer, and/or other types of motion sensors to sense motion of the device. The motion sensors can generate sensor data vectors having three-dimensional parameters (e.g., rotational vectors in x, y, and z-axis coordinates) indicating location, position, acceleration, rotational speed, and/or orientation of the device. The example device 1100 can also include one or more power sources 1126, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1100 can also include an audio and/or video processing system 1128 that generates audio data for an audio system 1130 and/or generates display data for a display system 1132. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1100. Alternatively, the audio system and/or the display system are external, peripheral components to the example device.

Although implementations of rollable screen device voice call management have been described in language specific to features and/or methods, the appended claims are not necessarily limited to the specific features or methods described. Rather, the specific features and methods are disclosed as example implementations of rollable screen device voice call management, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising a rollable display screen configurable in one of multiple display states corresponding to respective device form factors; a slidable display mount operable to one of extend or retract the rollable display screen into one of the multiple display states corresponding to a device form factor; an earpiece configured to emanate audio during a voice call, the earpiece integrated with at least one of the rollable display screen or the slidable display mount; and a configuration manager implemented at least partially in computer hardware and configured to initiate the slidable display mount for configuration of the rollable display screen to movably position the earpiece during the voice call.

Alternatively or in addition to the above described mobile device, any one or combination of: the configuration manager is configured to estimate a vertical face size of a user of the mobile device based at least in part on one or more device sensors that detect facial features of the user; and a position of the earpiece is based at least in part on the vertical face size of the user of the mobile device. The one or more device sensors include a camera imager and the configuration manager utilizes a facial recognition system to estimate the vertical face size of the user of the mobile device. The vertical face size of the user of the mobile device is estimated based at least in part on contextual data corresponding to the user; and the contextual data indicates at least one of: an age of the user of the mobile device, and the vertical face size is based on a predefined face size corresponding to the age of the user; or a gender of the user of the mobile device, and the vertical face size is based on a predefined face size corresponding to the gender of the user. The configuration manager is configured to movably position the earpiece by initiating to extend the rollable display screen corresponding to an expanded form factor of the mobile device. A compact form factor of the mobile device corresponds to a retracted display state of the rollable display screen, and the rollable display screen extends one of up or down from the retracted display state into an extended display state. The mobile device further comprising a mouthpiece configured to receive audio during the voice call, and wherein the configuration manager is configured to initiate to movably position the earpiece relative to a fixed position of the mouthpiece. The configuration manager is configured to initiate to movably position the earpiece relative to the fixed position of the mouthpiece based at least in part on a vertical face size of a user of the mobile device. The mobile device further comprising a mouthpiece configured to receive audio during the voice call, the mouthpiece integrated with at least one of the rollable display screen or the slidable display mount, and wherein the configuration manager is configured to movably position the earpiece and the mouthpiece during the voice call. The configuration manager is configured to detect a proximity of the earpiece to a user of the mobile device based at least in part on one or more proximity sensors, and wherein the configuration manager is configured to initiate to movably position the earpiece based on the proximity of the earpiece to the user. The configuration manager is configured to initiate the slidable display mount to revert the rollable display screen to an initial position based on a termination of the voice call.

A method, comprising detecting a voice call on a mobile device that includes a rollable display screen configurable in one of multiple display states corresponding to respective device form factors, the mobile device including a slidable display mount operable to one of extend or retract the rollable display screen; emanating audio from an earpiece during the voice call, the earpiece integrated with at least one of the rollable display screen or the slidable display mount; and initiating the slidable display mount for configuration of the rollable display screen to movably position the earpiece during the voice call.

Alternatively or in addition to the above described system, any one or combination of: the method further comprising estimating a vertical face size of a user of the mobile device based at least in part on one or more device sensors that detect facial features of the user; and positioning the earpiece based at least in part on the vertical face size of the user of the mobile device. The method further comprising positioning the earpiece by extending the rollable display screen to a corresponding expanded form factor of the mobile device, the rollable display screen extending one of up or down from a retracted display state into an extended display state. The method further comprising receiving audio during the voice call by a mouthpiece that is integrated with at least one of the rollable display screen or the slidable display mount, and wherein the earpiece is movably positioned relative to a fixed position of the mouthpiece. The method further comprising receiving audio during the voice call by a mouthpiece that is integrated with at least one of the rollable display screen or the slidable display mount, and wherein the earpiece and the mouthpiece are movably positioned during the voice call. The method further comprising detecting a proximity of the earpiece to a user of the mobile device based at least in part on one or more proximity sensors, and wherein the earpiece is movably positioned based on the proximity of the earpiece to the user. The method further comprising reverting the rollable display screen to an initial position based on a termination of the voice call.

A mobile device, comprising a rollable display screen configurable in one of multiple display states; a slidable display mount operable to one of extend or retract the rollable display screen into one of the multiple display states; and an earpiece integrated with at least one of the rollable display screen or the slidable display mount, the earpiece configured to be movably positioned relative to a mouthpiece during a voice call, the earpiece movably positioned by the rollable display screen configured to one of extend up or down from a retracted display state into an extended display state.

Alternatively or in addition to the above described system: a position of the earpiece relative to the mouthpiece during the voice call is based at least in part on an estimate of a vertical face size of a user of the mobile device.

The invention claimed is:

1. A mobile device, comprising:
   a rollable display screen configurable in one of multiple display states corresponding to respective device form factors;
   a slidable display mount operable to one of extend or retract the rollable display screen into one of the multiple display states corresponding to a device form factor;
   an earpiece configured to emanate audio during a voice call, the earpiece integrated with at least one of the rollable display screen or the slidable display mount;
   a configuration manager implemented at least partially in computer hardware and configured to:
   estimate a vertical face size of a user of the mobile device based at least in part on one or more device sensors that detect facial features of the user; and
   initiate the slidable display mount for configuration of the rollable display screen to movably position the earpiece during the voice call, wherein a position of the earpiece is based at least in part on the vertical face size of the user of the mobile device.

2. The mobile device of claim 1, wherein the one or more device sensors include a camera imager and the configuration manager utilizes a facial recognition system to estimate the vertical face size of the user of the mobile device.

3. The mobile device of claim 1 wherein:
   the vertical face size of the user of the mobile device is estimated based at least in part on contextual data corresponding to the user; and
   the contextual data indicates at least one of:
   an age of the user of the mobile device, and the vertical face size is based on a predefined face size corresponding to the age of the user; or
   a gender of the user of the mobile device, and the vertical face size is based on the predefined face size corresponding to the gender of the user.

4. The mobile device of claim 1, wherein the configuration manager is configured to movably position the earpiece by initiating to extend the rollable display screen corresponding to an expanded form factor of the mobile device.

5. The mobile device of claim 4, wherein a compact form factor of the mobile device corresponds to a retracted display state of the rollable display screen, and the rollable display screen extends one of up or down from the retracted display state into an extended display state.

6. The mobile device of claim 1, further comprising a mouthpiece configured to receive audio during the voice call, and wherein the configuration manager initiates to movably position the earpiece relative to a fixed position of the mouthpiece.

7. The mobile device of claim 6, wherein the configuration manager initiates to movably position the earpiece relative to the fixed position of the mouthpiece based at least in part on the vertical face size of the user of the mobile device.

8. The mobile device of claim 1, further comprising a mouthpiece configured to receive audio during the voice call, the mouthpiece integrated with at least one of the rollable display screen or the slidable display mount, and wherein the configuration manager is configured to movably position the earpiece and the mouthpiece during the voice call.

9. The mobile device of claim 1, wherein the configuration manager is configured to detect a proximity of the earpiece to the user of the mobile device based at least in part on one or more proximity sensors, and wherein the configuration manager initiates to movably position the earpiece based on the proximity of the earpiece to the user.

10. The mobile device of claim 1, wherein the configuration manager is configured to initiate the slidable display mount to revert the rollable display screen to an initial position based on a termination of the voice call.

11. A method, comprising:
    detecting a voice call on a mobile device that includes a rollable display screen configurable in one of multiple display states corresponding to respective device form factors, the mobile device including a slidable display mount operable to one of extend or retract the rollable display screen;

emanating audio from an earpiece during the voice call, the earpiece integrated with at least one of the rollable display screen or the slidable display mount;

estimating a vertical face size of a user of the mobile device based at least in part on one or more device sensors that detect facial features of the user; and initiating the slidable display mount for configuration of the rollable display screen to movably position the earpiece during the voice call, the earpiece positioned based at least in part on the vertical face size of the user of the mobile device.

12. The method of claim 11, further comprising:
positioning the earpiece by extending the rollable display screen to a corresponding expanded form factor of the mobile device, the rollable display screen extending one of up or down from a retracted display state into an extended display state.

13. The method of claim 11, further comprising:
receiving audio during the voice call by a mouthpiece that is integrated with at least one of the rollable display screen or the slidable display mount, and wherein the earpiece is movably positioned relative to a fixed position of the mouthpiece.

14. The method of claim 11, further comprising:
receiving audio during the voice call by a mouthpiece that is integrated with at least one of the rollable display screen or the slidable display mount, and wherein the earpiece and the mouthpiece are movably positioned during the voice call.

15. The method of claim 11, further comprising:
detecting a proximity of the earpiece to the user of the mobile device based at least in part on one or more proximity sensors, and wherein the earpiece is movably positioned based on the proximity of the earpiece to the user.

16. The method of claim 11, further comprising:
reverting the rollable display screen to an initial position based on a termination of the voice call.

17. A mobile device, comprising:
a rollable display screen configurable in one of multiple display states;

a slidable display mount operable to one of extend or retract the rollable display screen into one of the multiple display states; and an earpiece integrated with at least one of the rollable display screen or the slidable display mount, the earpiece configured to be movably positioned relative to a mouthpiece during a voice call, the earpiece movably positioned by the rollable display screen configured to one of extend up or down from a retracted display state into an extended display state, wherein a position of the earpiece relative to the mouthpiece during the voice call is based at least in part on an estimate of a vertical face size of a user of the mobile device.

18. The mobile device of claim 17, further comprising a camera imager and a facial recognition system to estimate the vertical face size of the user of the mobile device.

19. The mobile device of claim 17, wherein:
the vertical face size of the user of the mobile device is estimated based at least in part on contextual data corresponding to the user; and the contextual data indicates at least one of:
an age of the user of the mobile device, and the vertical face size is based on a predefined face size corresponding to the age of the user; or a gender of the user of the mobile device, and the vertical face size is based on the predefined face size corresponding to the gender of the user.

20. The mobile device of claim 17, wherein the earpiece is movably positioned by extending the rollable display screen corresponding to an expanded form factor of the mobile device.

* * * * *